Sept. 3, 1929.   O. KASTEN   1,727,066

REMOVABLE SUPPORT FOR ELECTRICALLY HEATED ARTICLES

Filed Feb. 23, 1929

Inventor:
Otto Kasten

Patented Sept. 3, 1929.

1,727,066

UNITED STATES PATENT OFFICE.

OTTO KASTEN, OF TWO RIVERS, WISCONSIN, ASSIGNOR TO METAL WARE CORPORATION, OF TWO RIVERS, WISCONSIN.

REMOVABLE SUPPORT FOR ELECTRICALLY-HEATED ARTICLES.

Application filed February 23, 1929. Serial No. 342,077.

This invention relates to new and useful improvements in removable supports for electrically heated articles, such as coffee percolators and the like.

One of the objects of the invention is the provision of a removable or detachable supporting member for electrical articles such as coffee percolators and the like whereby the articles may be supported upon a highly polished surface or the like without in any way injuring the surface due to the heating of the article.

A further object of the invention is the provision of a removable supporting member adapted to be detachably engaged with the base of an electrically heated article and provided with insulating supporting legs whereby to support the electrically heated article in spaced relation with the supporting surface so as to eliminate the danger of marring or disfiguring the supporting surface due to the heating article.

A further object of the invention is the provision of a removable supporting member for electrically heated articles so constructed and arranged that it may be quickly and readily engaged with the base or supporting portion of the article or quickly removed therefrom and the device can be constructed in various sizes in accordance with the desired use of the same.

With the above and other objects in view, the invention consists in the novel features of construction, the combination and arrangement of parts hereinafter more fully set forth, pointed out in the claims and shown in the accompanying drawings wherein:

Figure 1:
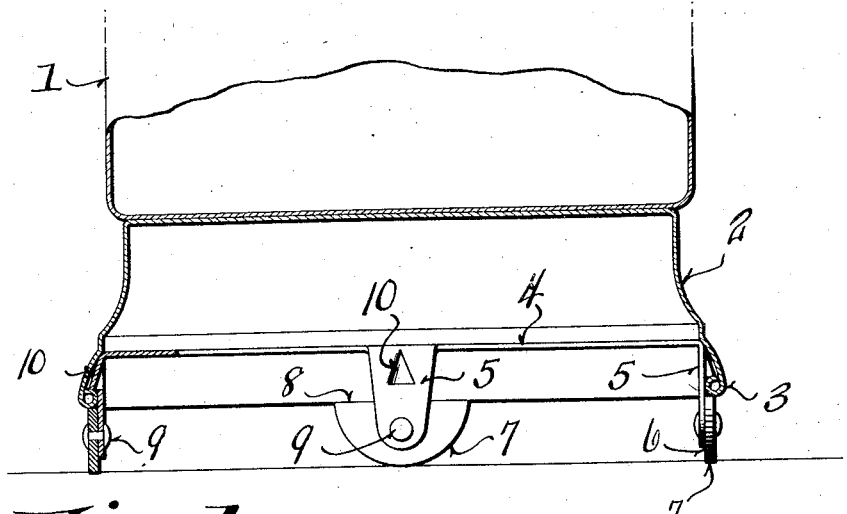
Figure 1 is a detailed section on the line 1—1 of Figure 2, illustrating the application of my improved supporting member.
Figure 2:
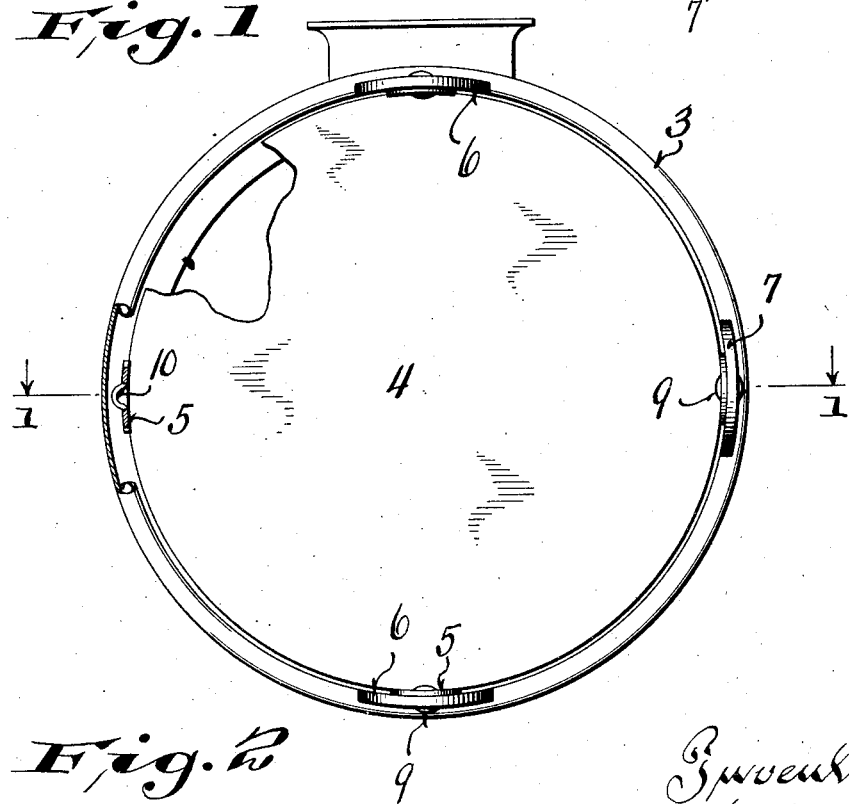
Figure 2 is a bottom plan view with parts thereof broken away and shown in cross section.

Referring more particularly to the drawings wherein I have illustrated the construction and application of my device, numeral 1 indicates the body of a container such as a coffee percolator having a skirted base 2 formed at its lower edge with a beading 3. Ordinarily the container is supported upon the beading 3 which forms a real base or supporting portion of the container, but in a great many instances it is found desirable to support the container upon a table provided with a highly polished surface and in order to eliminate the disfiguring of a polished surface through the heating of the container, it is necessary to place beneath the base a substantial insulating article such as a pad, either of asbestos or similar material. In order to do away with the pad, I provide a removable supporting member adapted to be detachably connected to the base 2 for supporting the container on a highly polished surface without injuring the surface.

The improved supporting member comprises a disc like body 4 having depending arms 5 arranged at spaced points around the circumference of the disc and each of these arms carry an insulating member 6 which form the supporting shoes for the disc. The members 6 are preferably provided with an arcuate bearing surface 7 and with a flat inner surface 8.

These members are supported upon the lower ends of the arms 5 by means of the rivets 9, although other suitable fastening members may be provided.

It will be noted in Figure 1 that the shoes or members 6 are positioned on the arms 5 so as to allow a portion thereof to project below the ends of the arms and space all metal parts of the device from the surface on which the shoes should rest. In order to detachably connect the disc 4 with the base member 2, a yieldable catch member 10 is struck out in each one of the arms 5. This catch member projects beyond the outer surface of the arm 5 and is adapted to engage the beading 3 upon the upper side thereof as shown in Figure 1 for retaining the disc 5 in co-operation with the base 2.

In placing my improved supporting member in position in the base of an article such as a percolator or the like, which is provided with a hollow base member, the same is centered relative the base 2 and then pushed inwardly until the yieldable catches 10 have passed the beading 3 where they will spring outwardly and engage the beading as shown in Figure 1 to prevent incidental detachment of the disc 5 from the base. It will be apparent that when the catch members 10 are engaged above the beading 3, the flat surface 8 of the shoes 6 will rest against the lower side of the beading so as to prevent rocking or rotative movement of the shoes.

It will be apparent that when it is desired to remove the supporting member from the base 2, it is only necessary to apply an out-side pressure to one of the shoes 6 in order to detachably connect the catch member carried by the arm 5 to which the shoe is attached for disengaging the catch from the beading. This will permit ready removal of the entire supporting member. It will also be noted that by providing the insulating members 6 the electrically heated article can be readily placed upon a highly polished surface during the use of the article without in any way disfiguring the supporting surface.

It will be apparent that I have provided a simple and inexpensive device which can be quickly and readily applied to an electrically heated article or removed therefrom and which will eliminate the necessity of using separate insulating pads for supporting the article upon a surface where it is desired to eliminate the disfiguring of the surface. If desirable, the disc 4 may be made of aluminum or similar material so that it will be comparatively light and durable.

While I have shown and described the preferred embodiment of my invention, it will be apparent that slight changes may be made in the construction when putting the invention into practice without departing from the spirit of the same or the scope of the appended claims.

I claim—

1. In combination with a substantially hollow supporting base having an inturned flange, of a supporting element having depending arms, shoes of insulating material attached to the outer ends of the arms and yieldable members carried by the arms and adapted to be detachably engaged with the flange for forming detachable connection between the supporting member and the base.

2. A supporting base comprising a body portion, arms projecting at right angles to the body and spaced around the circumference thereof, insulating shoes carried by the arms at their outer ends and catch members carried by said arms inwardly of the shoes.

3. A device of the class described, including a disc like body, arms projecting laterally from the body and spaced around its circumference, insulating shoes attached to the outer ends of the arms and formed with arcuate bearing surfaces, and yieldable catches carried by the arms and disposed between the shoes and the body member.

In testimony that I claim the foregoing I have hereunto set my hand at Two Rivers, in the county of Manitowoc and State of Wisconsin.

OTTO KASTEN.